3,051,758
PRODUCTION OF MERCAPTANS AND SULFIDES
Richard D. Franz and Paul F. Warner, Phillips, Tex., assignors to Phillips Petroleum Company, a corporation of Delaware
No Drawing. Filed May 22, 1961, Ser. No. 125,299
5 Claims. (Cl. 260—609)

This invention relates to the production of alkyl mercaptans and heavy dialkyl polysulfides. In another aspect, it relates to a process for increasing the production of heavy dialkyl mono- and polysulfides, obtained as kettle product from the synthesis of tertiary dodecyl mercaptan.

The reaction between hydrogen sulfide and olefinic hydrocarbons to produce alkyl mercaptans is an established synthesis. These mercaptans are especially useful as modifiers in the manufacture of synthetic rubber. In this synthesis, a kettle product comprising heavy dialkyl mono- and polysulfides is obtained after separating the mercaptan product from the reaction effluent by fractionation. It has recently been discovered by others that this kettle product is useful in pesticidal compositions for the control of insects, fungi, mites, and other plant pests. We have discovered that the amount of this kettle product from this mercaptan synthesis can be increased by carrying out the mercaptan synthesis in the presence of a ditertiary alkyl polysulfide, such as ditertiary dodecyl pentasulfide.

Accordingly, an object of this invention is to provide an improved process for producing a product useful in insecticidal compositions. Another object is to provide an improved method for producing alkyl mercaptans and dialkyl mono- and polysulfides. Another object is to increase the amount of kettle product produced in the synthesis of alkyl mercaptans from hydrogen sulfide and olefins. Other objects and advantages of this invention will become apparent to those skilled in the art from the following discussion and appended claims.

In carrying out the subject invention, we do not propose to alter the known hydrogen sulfide-olefin synthesis reaction except for carrying out the same in the presence of the ditertiary alkyl polysulfide, and reference is made to the prior art for a description of the basic mercaptan synthesis.

The olefin feed stocks which can be employed according to our invention include those containing olefins having 8 to 20 carbon atoms per molecule, although olefins outside of this range can be used. Olefins having from about 12 to 16 carbon atoms are preferred. The olefins can be normal (i.e., straight chain) olefins or they can be of the branched configuration, and the double bond can be in any position in the molecule. High boiling byproducts of catalytic codimer operation are particularly useful, and homopolymers of propylene, butylenes, and amylenes, as well as copolymers of these olefins, can be used. For example, polymer fractions boiling above 335° F. and having a boiling range within the limits of about 335° to 400° F. constitute olefinic feed stocks for synthesis of $C_{10}$ and higher mercaptans. Olefin isomers ranging from $C_{10}$ to $C_{16}$ may be included in the range, however, the $C_{12}$ and $C_{13}$ will predominate. A particular feed stock which we prefer to employ is that obtained from the polymerization of propylene and is that portion of the polymer product which boils in the range of 345° F. to about 370° F., this fraction comprising mainly $C_{12}$ olefins having principally the tertiary configuration and sometimes referred to as propylene tetramer.

The hydrogen sulfide reactant is ordinarily employed in a molal excess with reference to the olefin content of the feed. The hydrogen sulfide to olefin mol ratio will generally be from about 1.5:1 and 10:1, with the preferred range being between 2:1 and 4:1.

The flow rates employed for charging the olefin-sulfide mixture to the reaction chamber will depend upon the type of feed stocks used, but generally will be in the range of 1 to 10 liquid volumes per volume of catalyst per hour, preferably 1.5 to 2.5 v./v./hr.

The reaction temperatures can also vary and generally will be within the range of about 100 to 400° F., preferably between about 250 and 350° F. Reaction pressures will also depend upon the nature of the olefin feed, and this will vary from 100 to 2,000 p.s.i.a., preferably 500 to 1,000 p.s.i.a.

Any catalyst can be used in the mercaptan synthesis, but ordinary surface active solid absorbent catalysts are preferred, such as natural or activated clays, or synthetic gel-type silica-metal oxide composition comprising a major portion of silica and a minor portion (usually about 1 to 5 weight percent) of an oxide of a metal belonging to groups IIIB and IVA of the periodic system, including boron, aluminum, gallium, indium, thallium, titanium, zirconium, hafnium, and thorium. The mercaptan reaction zone will consist of a stationary bed of granular catalyst, although other methods of contacting the solid catalyst with the feed can be used.

The reaction effluent can be continuously fractionated or otherwise treated to separate hydrogen sulfide and unreacted olefins from the product. Other suitable treatment such as chemical absorption, etc., may be applied to the reaction effluent to recover the mercaptans and polysulfides or to separate hydrogen sulfide from the unreacted olefins. The hydrogen sulfide and the unconverted olefins are ordinarily recycled to the mercaptan synthesis reactor.

In a preferred method of recovery, the mercaptan reaction mixture is passed into a high pressure hydrogen sulfide stripper, operated at a temperature slightly above the reaction temperature (preferably at about 245 to 255° F. and about 43 p.s.i.g.). The partially denuded hydrogen sulfide reaction product is then passed to a low pressure hydrogen sulfide stripper, operated for example at about 235° F. and atmospheric pressure. The denuded hydrogen sulfide reaction product is then passed to a polymer tower, for example operated at 256° F. and 5 mm. Hg pressure absolute, to remove unreacted olefin overhead. The olefin-free product removed as bottoms product from the polymer tower can be heated and passed to a mercaptan recovery tower, operated for example at 272° F. and 3 mm. Hg absolute pressure, to separate the mercaptan product overhead from the heavy high-boiling kettle product.

The kettle product will comprise a mixture of alkyl mercaptan and heavy dialkyl mono- and polysulfides. In the case where tertiary dodecyl mercaptan (Sulfole) is prepared by the interaction of propylene tetramer with hydrogen sulfide, the kettle product will comprise a mixture of tertiary dodecyl mercaptan and heavy dialkyl sulfides which are believed to be comprised of a mixture of didodecyl disulfide together with other dialkyl mono-, di- and polysulfides in small amounts. The physical properties of the kettle product will depend in part upon the relative proportions of mercaptan and dialkyl sulfides contained therein. Broadly, the mercaptan product of this material usually ranges from about 20 to 60 weight percent, the remainder consisting essentially of dialkyl disulfides. We have discovered that the amount of sulfides recovered in the kettle product can be materially increased, e.g., up to 4 or more times as much, by carrying out the synthesis in the presence of a ditertiary alkyl polysulfide.

Polysulfides which are used according to the practice of this invention can be represented by the general formula $R_1$—$S_x$—$R_2$, where $R_1$ and $R_2$ are tertiary alkyl radicals having from 5 to 20 carbon atoms each, the carbon atom of each alkyl radical linking the same to the sulfur atoms being tertiary carbon atoms, and where $x$ is an integer from 2 to 5. We prefer that the number of carbon atoms in each of the tertiary alkyl radicals be the same as the number of carbon atoms in the alkyl radical of the alkyl mercaptan produced by the synthesis reaction; for example, where dodecyl mercaptan is produced, we prefer to use ditertiary dodecyl pentasulfide. These polysulfides can be either di-, tri-, tetra-, or pentasulfides, the latter being preferred. Representative tertiary alkyl radicals include pentyl, hexyl, octyl, decyl, dodecyl, tridecyl, tetradecyl, pentadecyl, hexadecyl, octadecyl, eicosyl, and the like.

The ditertiary alkyl polysulfides used to increase the yield of kettle product according to this invention can be prepared by well-known methods, for example by reacting an alkyl mercaptan with sulfur in the presence of an alkali catalyst such as an alkali metal oxide, alkali metal hydroxide, alkali metal alcoholates, alkali metal sulfides, alkali metal polysulfides, alkaline earth oxides, phosphorus pentaoxide, and the like. The amount of ditertiary alkyl polysulfide used in the practice of this invention can be varied and will be dependent upon such things as the olefin content of the feed, and generally will be in the range between about 1 to 20 volume percent, preferably between about 10 to 15 volume percent, based on the olefin content of the feed.

In addition to increasing the yield of kettle product, we have discovered that use of the ditertiary alkyl polysulfide also results in extending the catalyst half-life, i.e., the number of volumes of olefin which can be passed over the catalyst before the mercaptan content of the reaction effluent falls below 50 percent of theoretical.

The objects and advantages of this invention are further illustrated by the following example, but it should be understood that the various conditions of reaction, reactants, temperatures, etc. set forth in this example should not be construed to limit unduly the invention.

EXAMPLES

Propylene tetramer (having the properties set forth in Table I) was premixed with hydrogen sulfide (and ditertiary dodecyl pentasulfide, where used) in a cylinder pressurized to 800 p.s.i.g. with nitrogen gas, and the feed charged to a reactor. The reactor used was a jacketed stainless steel tube (one-inch I.D., 18 inches in length) equipped with a thermo-well and heating coil, and containing Filtrol Grade 71 catalyst having the approximate chemical formula $$Al_2O_3 \cdot 2MgO \cdot 24SiO_2 \cdot 6H_2O(CaO, Na_2O)$$

The polysulfide used in one of the runs had a specific gravity (60/60) of 1.010 and a total sulfur content of 32.0 weight percent, and a calculated molecular weight of 498.

Table I

| | |
|---|---|
| Refractive index, 20/D | 1.4365 |
| Specific gravity, 20/4 | 0.7678 |
| Bromine number | 117.2 |

Distillation (ASTM D86), °F.:

| | |
|---|---|
| IBP | 346 |
| 5 | 350 |
| 10 | 351 |
| 20 | 354 |
| 30 | 356 |
| 40 | 359 |
| 50 | 361 |
| 60 | 363 |
| 70 | 366 |
| 80 | 370 |
| 90 | 374 |
| 95 | 380 |
| DP | 383 |
| EP | 398 |

Charge and reaction conditions for the control run and the run made according to our invention are summarized in Table II:

Table II

| | Run 1 | Run 2 (control) |
|---|---|---|
| Charge: | | |
| Olefin, lbs | 20.1 | 30.1 |
| Ditertiary dodecyl polysulfide, lbs | 1.4 | 0 |
| Hydrogen sulfide, lbs | 6.5 | 10.4 |
| H₂S/olefin mole ratio | 1.6 | 1.7 |
| Conditions: | | |
| Pressure, psig | 800 | 800 |
| Flow rate, ave. v./v./hr | 1.43 | 1.43 |
| Catalyst temperature (internal hot spot), °F | 228–247 | 243–255 |
| Jacket temperature, °F | 205 | 205 |

The effluent from that run where the polysulfide was used according to our invention was fractionated on a spinning band column (¾ inch I.D., 4 feet in length) to obtain the mercaptan product and the heavy dialkyl polysulfide product. The mercaptan product from the latter run was compared with that obtained from the standard Sulfole process by both infrared and chromatographic analyses. No appreciable difference in the two mercaptan samples could be detected by the infrared analysis. The chromatographic analysis showed, in both cases, a multitude of components with the same general configuration and only minor differences in the distribution of components. The yields for the products obtained by that run wherein the polysulfide of this invention was used are compared in Table III with the product yields obtained by the standard Sulfole process which is comparable to that of the control run. The data of Table III show that the amount of kettle product recovered by the process of this invention is four times as much as that recovered by the standard Sulfole process.

Table III

| | Run 1 | Run 2 (control) |
|---|---|---|
| Products (total recovery basis), mole percent: | | |
| Recycle olefin | 25.3 | 15.4 |
| C₁₂ mercaptan | 70.2 | 83.5 |
| C₁₂ sulfides | 4.5 | 1.1 |
| Total | 100 | 100 |
| Ultimate yield of C₁₂ mercaptan, wt. percent | 91.2 | 98.7 |

Various modifications and alterations of this invention will become apparent to those skilled in the art from the foregoing discussion, and it should be understood that our invention is not to be limited unduly to that set forth herein for illustrative purposes.

We claim:
1. In a process for the production of alkyl mercaptans wherein olefin feed stock is reacted with hydrogen sulfide, the improvement comprising carrying out said reaction in the presence of a ditertiary alkyl polysulfide.
2. In a process for the production of alkyl mercaptans and dialkyl sulfides, wherein olefin feed stock is reacted with hydrogen sulfide in the presence of a surface active solid absorbent catalyst, unreacted hydrogen sulfide and olefin feed stock are separated from the reaction effluent, and the latter is separated into an alkyl mercaptan product and a dialkyl sulfide product, the improvement comprising carrying out said reaction in the presence of an amount of a ditertiary alkyl polysulfide sufficient to increase the yield of said dialkyl sulfide product.

3. The method according to claim 2 wherein said ditertiary alkyl polysulfide has the general formula $$R_1-S_x-R_2$$

wherein $R_1$ and $R_2$ are tertiary alkyl radicals having from 5 to 20 carbon atoms with those carbon atoms attached to the sulfur atoms being tertiary carbon atoms, and where $x$ is an integer from 2 to 5.

4. The method according to claim 3 wherein said tertiary alkyl radicals are the same as the alkyl radical in the alkyl mercaptan product.

5. The method according to claim 3 wherein said olefin feed stock is a $C_{12}$ tertiary olefin hydrocarbon fraction boiling in the range of about 345 to 370° F., and wherein said ditertiary alkyl polysulfide is ditertiary dodecyl pentasulfide.

No references cited.